May 7, 1940.   H. R. MAZURIE   2,199,749
PROTECTOR FOR TUBULAR OBJECTS
Filed Nov. 17, 1937
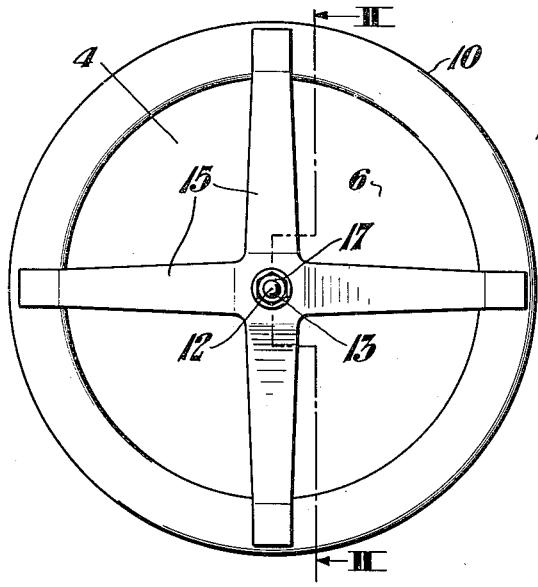
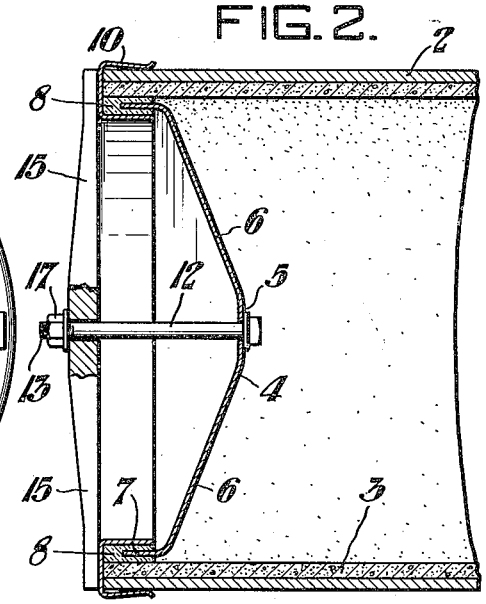
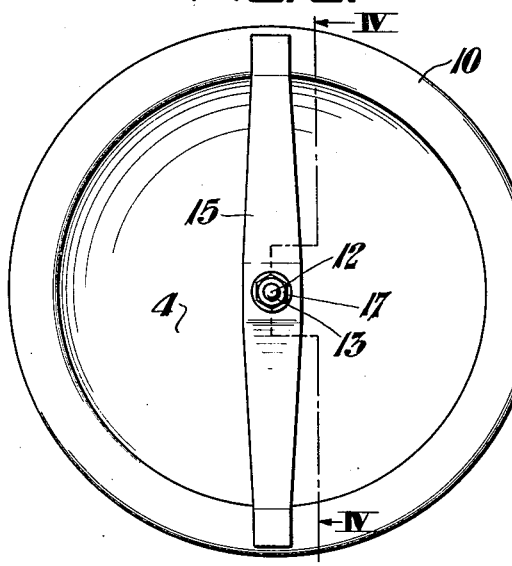
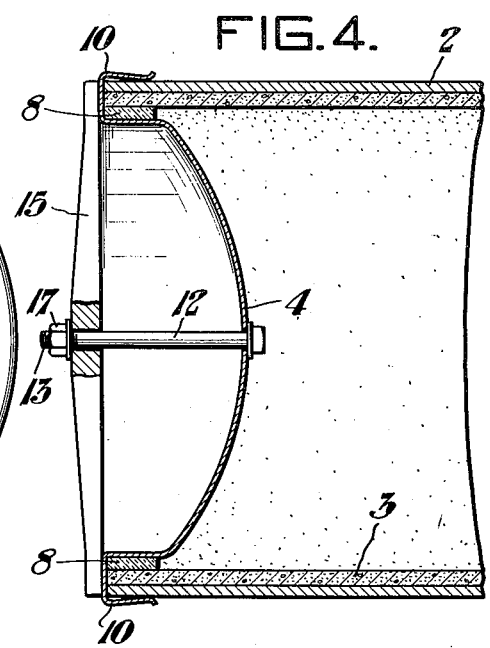
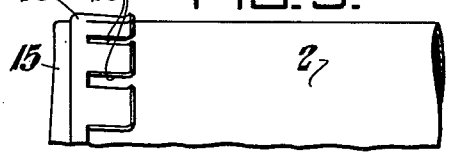
Inventor:
HARRY R. MAZURIE,
by: Usina & Rauber
his Attorneys.

Patented May 7, 1940

2,199,749

UNITED STATES PATENT OFFICE 2,199,749

PROTECTOR FOR TUBULAR OBJECTS

Harry R. Mazurie, Pittsburgh, Pa., assignor to National Tube Company, a corporation of New Jersey Application November 17, 1937, Serial No. 175,149

3 Claims. (Cl. 138—96)

This invention relates to protectors for tubular objects and, more particularly, to those which are adapted to protect those objects having interior linings.

In recent years, there has been a considerable demand for interiorly lined pipes and tubes which, of course, can be manufactured only at increased cost. These pipes or tubes are transported in stacked relationship, and their interior linings are readily damaged. Numerous ways have been suggested for protecting the interior linings of such pipe or tubes and while some of them have proved effective, their cost has been prohibitive.

It is accordingly one of the objects of the present invention to provide a novel protector for interiorly lined or coated pipes or tubes which may be easily and cheaply manufactured and quickly applied and removed.

The foregoing and other objects will be apparent after referring to the drawing in which:

Figure 1 is a side elevation of the device of the invention.

Figure 2 is a sectional view on the line II—II of Figure 1.

Figures 3 and 4 are views corresponding to Figures 1 and 2, respectively, but disclose a modification thereof.

Figure 5 is a fragmentary view of another modification.

Referring more particularly to the drawing, the numeral 2 designates a conventional pipe or tube having an interior lining 3 of suitable material, such as, for example, copper, vitreous enamel, etc. Within the extremities of the pipe or tube there is disposed a frusto-conical cup 4 comprising a disk-like central portion 5, an elongated outwardly flared portion 6 and an annular peripheral flange 7. The diameter of the cup 4 is slightly smaller than the interior diameter of the pipe or tube. The annular peripheral flange 7 is imbedded in an annular rubber ring 8 which snugly fits the interior of the pipe or tube. A ring 10 which is U-shaped in section is disposed over the outer surface of the pipe or tube 2, with its side walls embracing between them the exterior wall of the pipe or tube and the interior surface of the annular rubber ring 8. As shown in Figure 2 of the drawing, the dimensions of the U-shaped ring 10 are such that the annular rubber ring 8 is tightly expanded against the inner wall of the pipe or tube.

The central portion 5 of the cup 4 is suitably apertured and provided with an outwardly extending elongated bolt 12, the threaded portion 13 of which projects beyond the terminal extremity of the pipe or tube. This elongated bolt 12 carries a spider 15, the legs of which bear against the web-portion of the U-shaped ring 10.

The spider 15 is held on the elongated bolt 12, which extends through the central portion thereof, by means of a nut 17.

Referring to Figures 3 and 4 of the drawing there is disclosed a modified form of the device of the invention. This comprises the formation of the U-shaped ring 10 of Figures 1 and 2 as an integral part of the peripheral flange 7 of the cup 4. In addition, the cup 4 is shown as dome-shaped in lieu of the frusto-conical form of Figures 1 and 2.

Referring to Figure 5, there is shown another modification which comprises the slitting, as at 10$^a$, of the outer wall of the U-shaped ring 10 to provide exterior tongues.

While I have shown and described several specific embodiments of the present invention, it will be seen that I do not wish to be limited exactly thereto, since various modifications may be made without departing from the scope of the invention, as defined in the following claims.

I claim:

1. A protector for a tubular object comprising a supporting member for disposition in the end of the tubular object, a flexible annular ring carried by said supporting member, said flexible annular ring being constructed and arranged for disposition proximate the interior surface of the tubular object, a U-shaped annular ring, said U-shaped annular ring being constructed and arranged to fit over the end of said tubular object and said flexible annular ring, and means for expanding said flexible annular ring into contact with the interior surface of the tubular object.

2. A protector for a tubular object comprising a supporting member for disposition in the end of the tubular object, a flexible annular ring carried by said supporting member, said flexible annular ring being constructed and arranged for disposition proximate the interior surface of the tubular object, a U-shaped annular ring, said U-shaped annular ring being constructed and arranged to fit over the end of said tubular object and said flexible annular ring, and means for expanding said flexible annular ring into contact with the interior surface of the tubular object, said last-named means being operable through the deformation of said supporting member.

3. A protector for a tubular object comprising a supporting member for disposition in the end of the tubular object, a flexible annular ring carried by said supporting member, a U-shaped annular ring carried by said supporting member, said U-shaped annular ring being constructed and arranged to fit over the end of the tubular object and said flexible annular ring, and means for expanding said flexible annular ring into contact with the interior surface of the tubular object.

HARRY R. MAZURIE.